US012192846B2

(12) United States Patent
Elindra et al.

(10) Patent No.: US 12,192,846 B2
(45) Date of Patent: Jan. 7, 2025

(54) METHOD FOR IDENTIFYING AND BOOKING THE UNOCCUPIED WORKSTATIONS (71) Applicant: CARRIER CORPORATION, Palm Beach Gardens, FL (US)

(72) Inventors: Kameswari Elindra, Telangana (IN); Bhabani Sankar Nanda, Orissa (IN); Nagavendra Chappa, Telangana (IN); Adam Kuenzi, Silverton, OR (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 509 days.

(21) Appl. No.: 17/254,020

(22) PCT Filed: Sep. 26, 2019

(86) PCT No.: PCT/US2019/053153
§ 371 (c)(1),
(2) Date: Dec. 18, 2020

(87) PCT Pub. No.: WO2020/086211
PCT Pub. Date: Apr. 30, 2020

(65) Prior Publication Data
US 2021/0243553 A1 Aug. 5, 2021

(30) Foreign Application Priority Data
Oct. 23, 2018 (IN) .............. 201811039901

(51) Int. Cl.
H04W 4/02 (2018.01)
G01S 5/02 (2010.01)
(Continued)

(52) U.S. Cl.
CPC .............. *H04W 4/021* (2013.01); *G01S 5/02* (2013.01); *G01S 5/04* (2013.01); *G01S 2205/01* (2020.05)

(58) Field of Classification Search
CPC .. H04W 4/021; G01S 5/02; G01S 5/04; G01S 2205/01
See application file for complete search history.

(56) References Cited

U.S. PATENT DOCUMENTS 7,554,437 B2  6/2009  Axelsen
8,352,296 B2  1/2013  Taneja et al.
(Continued)

FOREIGN PATENT DOCUMENTS

EP        2442260 A1   4/2012
WO  2017142541 A1   8/2017

OTHER PUBLICATIONS

International Search Report for International Application No. PCT/US2019/053153, International Filing Date Sep. 26, 2019, Date of Mailing Jan. 2, 2020, 4 pages.
(Continued)

Primary Examiner — Dai Phuong
(74) Attorney, Agent, or Firm — CANTOR COLBURN LLP (57) ABSTRACT A method of recommending workstations includes determining a location of a mobile device; determining a zone of interest for the mobile device in response to the location; determining a list of available workstations within the zone of interest; and displaying the list of available workstations within the zone of interests on the mobile device.

9 Claims, 3 Drawing Sheets (51) Int. Cl.
 *G01S 5/04* (2006.01)
 *H04W 4/021* (2018.01)

(56) References Cited

U.S. PATENT DOCUMENTS

| | | | |
|---|---|---|---|
| 8,743,198 | B2 | 6/2014 | Padmanabh et al. |
| 8,791,790 | B2 * | 7/2014 | Robertson ................. G07C 9/20 |
| | | | 455/411 |
| 8,797,159 | B2 | 8/2014 | Kirkpatrick et al. |
| 9,146,115 | B2 | 9/2015 | Geffner et al. |
| 9,575,180 | B2 | 2/2017 | Miller et al. |
| 9,766,079 | B1 | 9/2017 | Poel et al. |
| 9,955,316 | B2 | 4/2018 | Jampani et al. |
| 2003/0149576 | A1 | 8/2003 | Sunyich |
| 2008/0291021 | A1 | 11/2008 | Bhogal et al. |
| 2012/0078676 | A1 | 3/2012 | Adams et al. |
| 2014/0149519 | A1 | 5/2014 | Redfern et al. |
| 2014/0310630 | A1 | 10/2014 | Asikainen et al. |
| 2014/0359718 | A1 * | 12/2014 | Turunen ................... H04W 4/80 |
| | | | 726/4 |
| 2017/0289753 | A1 * | 10/2017 | Mahasenan ........... H04W 4/023 |
| 2019/0235092 | A1 * | 8/2019 | Bastian, II .............. G01P 15/04 |
| 2020/0067611 | A1 * | 2/2020 | Douglas ............... H04B 17/327 |
| 2020/0104762 | A1 * | 4/2020 | Gibson ................... H04W 4/80 |

OTHER PUBLICATIONS

Written Opinion for International Application No. PCT/US2019/053153, International Filing Date Sep. 26, 2019, Date of Mailing Jan. 2, 2020, 8 pages.

* cited by examiner

METHOD FOR IDENTIFYING AND BOOKING THE UNOCCUPIED WORKSTATIONS

CROSS REFERENCE TO RELATED APPLICATIONS

This application is a National Stage application of PCT/US2019/053153, filed Sep. 26, 2019, which claims the benefit of India Application No. 201811039901, filed Oct. 23, 2018, both of which are incorporated by reference in their entirety herein.

BACKGROUND

The subject matter disclosed herein generally relates to the field of workstation allocation system, and more particularly to an apparatus and method of operating a workstation allocation system.

Existing seating systems are typically assigned manually by a human resources representative and do not allow much flexibility for users to seat where they desire.

BRIEF SUMMARY

According to one embodiment, a method of recommending workstations is provided. The method including: determining a location of a mobile device; determining a zone of interest for the mobile device in response to the location; determining a list of available workstations within the zone of interest; and displaying the list of available workstations within the zone of interests on the mobile device.

In addition to one or more of the features described above, or as an alternative, further embodiments may include that the location is a current location of the mobile device.

In addition to one or more of the features described above, or as an alternative, further embodiments may include that the location is a future location of the mobile device.

In addition to one or more of the features described above, or as an alternative, further embodiments may include that the current location of the mobile device is determined utilizing short-range wireless signal triangulation between the mobile device and at least one of access controls and wireless access protocol devices.

In addition to one or more of the features described above, or as an alternative, further embodiments may include that the current location of the mobile device is determined utilizing short-range wireless distance proximity measurements between the mobile device and at least one of access controls and wireless access protocol devices.

In addition to one or more of the features described above, or as an alternative, further embodiments may include: determining workstation preferences associated with a mobile device; and removing workstations from the list not aligned with the workstations preferences.

In addition to one or more of the features described above, or as an alternative, further embodiments may include: receiving a selection input from an input device of the mobile device, the selection input selecting a desired workstation from the list of available workstations.

In addition to one or more of the features described above, or as an alternative, further embodiments may include: granting the mobile device authorization to adjust components of the desired workstation.

In addition to one or more of the features described above, or as an alternative, further embodiments may include: displaying a route to the desired workstation on the mobile device.

In addition to one or more of the features described above, or as an alternative, further embodiments may include: granting the mobile device authorization to actuate access controls to access the desired workstation.

According to another embodiment, a workstation determination engine for recommending workstations is provided. The method including: a location determination module configured to determine a location of a mobile device and a zone of interest for the mobile device in response to the location; and a workstation scheduling module configured to determine a list of available workstations within the zone of interest and display a list of available workstations within the zone of interests on the mobile device.

In addition to one or more of the features described above, or as an alternative, further embodiments may include that the location is a current location of the mobile device.

In addition to one or more of the features described above, or as an alternative, further embodiments may include that the location is a future location of the mobile device.

In addition to one or more of the features described above, or as an alternative, further embodiments may include that the current location of the mobile device is determined utilizing short-range wireless signal triangulation between the mobile device and at least one of access controls and wireless access protocol devices.

In addition to one or more of the features described above, or as an alternative, further embodiments may include that the current location of the mobile device is determined utilizing short-range wireless distance proximity measurements between the mobile device and at least one of access controls and wireless access protocol devices.

In addition to one or more of the features described above, or as an alternative, further embodiments may include: a workstation preferences module configured to determine workstation preferences associated with a mobile device and remove workstations from the list not aligned with the workstations preferences.

In addition to one or more of the features described above, or as an alternative, further embodiments may include that the workstation scheduling module is configured to receive a selection input from an input device of the mobile device, the selection input selecting a desired workstation from the list of available workstations.

In addition to one or more of the features described above, or as an alternative, further embodiments may include that the workstation scheduling module is configured to grant the mobile device authorization to adjust components of the desired workstation.

In addition to one or more of the features described above, or as an alternative, further embodiments may include that the workstation scheduling module is configured to display a route to the desired workstation on the mobile device.

According to another embodiment, a computer program product tangibly embodied on a computer readable medium is provided. The computer program product including instructions that, when executed by a processor, cause the processor to perform operations including: determining a location of a mobile device; determining a zone of interest for the mobile device in response to the location; determining a list of available workstations within the zone of interest; and displaying the list of available workstations within the zone of interests on the mobile device.

Technical effects of embodiments of the present disclosure include a system to recommend workstations to a user of a mobile devices.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
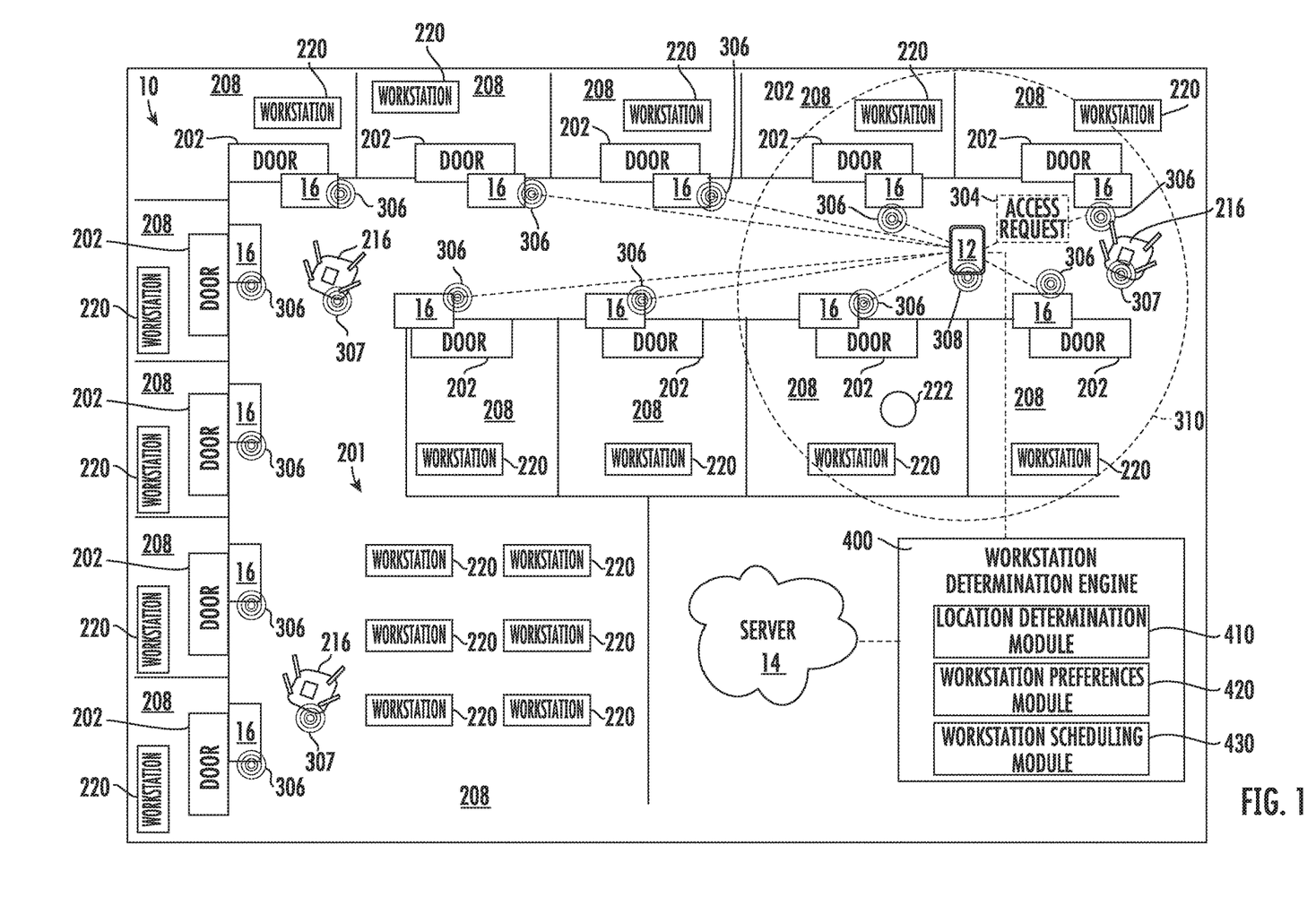
FIG. 1 illustrates a general schematic system diagram of an access control system, in accordance with an embodiment of the disclosure.

FIG. 1 schematically illustrates a workstation allocation system 10. The workstation allocation system 10 generally includes a mobile device 12, a server 14, a wireless access protocol device 216, and an access control 16. The workstation allocation system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The workstation allocation system 10 may include any number of doors 202 and rooms 208. Further, there may be multiple doors 202 and access controls 16 for each room 208. A workstation 220 may be located within each room 208. The workstation 220 may include components, such as, for example, a desk, a chair, computer, a computer monitor, a phone, a telephone, or any other tool an individual needs to accomplish their job. It is understood that the workstations 220 may also be located outside of a room 208 secured by an access control 16, as shown at 201. It is understood that while the workstation allocation system 10 utilizes rooms 208 for exemplary illustration, embodiments disclosed herein may be applied to other workstation allocations such as constructions sites, shared workspaces, outdoor workspaces, vehicles, trucks, airplanes, boats, etc.

A mobile device 12 belonging to an individual may be granted access to one or more access controls 16 (e.g. the door lock on an office or hotel room assigned to the individual). It is understood that while the example of FIG. 1 utilizes a mobile device 12, alternatively, a physical key card 92 may also be utilized to grant access to access controls 16. In one example, when an individual begins working at a new building their mobile device 12 will be granted access to particular rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices 12 per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 may be a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 216 or through the mobile device 12.

The positional data of the mobile device 12 may be detected using one or more methods and apparatus. The positional data may be collected by the mobile device 12 and/or the server 14. The positional data may include a location of the mobile device 12 and/or a movement of mobile device 12 that is a derivative of a location of the mobile device 12, such as, for example, velocity, acceleration, jerk, jounce, snap . . . etc. The mobile device 12 may a determine positional data by the GPS 48, by the IMU sensor 57, wireless signal strength, and/or by triangulating wireless signals 307 from the wireless access protocol device(s) 216 or wireless signals 306 from the access control(s) 16. The location of the mobile device 12 may also be detected through triangulation of wireless signals emitted from the access control 16 or signal strength of wireless signals emitted from the access control 16. The location of the mobile device 12 may be detected using any other desired and known location detection/position reference means.

The access control 16 may be configured to continuously advertise a wireless signal 306. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine positional data of the mobile device 12 in response to a signal strength of the wireless signal 306. In an embodiment, once the zones of interest 310 are determined, the mobile device 12 may only be configured to detect the wireless signal 306 of the access controls 16 when the mobile device 12 is within the zone of interest 310.

Positional data of the mobile device 12 may also be determined using the wireless access protocol device 216. The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and positional data of the mobile device 12 may be determined in response to a signal strength of the wireless signal 307.

Positional data of the mobile device 12 may also be determined using the wireless access protocol device 216 and/or the access controls 16 to detect a wireless signal 308 advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and positional data of the mobile device 12 may be determined in response to a signal strength of the wireless signal 308. The location of the mobile device 16 may be triangulated by relaying up to the location determination module 410 the strength of each wireless signal 308 detected and then the location determination module 410 can triangulate the position.

Wireless signal interaction data between the mobile device 12 and at least one of the access device 16 and the wireless access protocol device 216 may transmitted to the server 14 to determined positional data. In an embodiment, the location determination module 410 may be located on the server 14 and may be used to determine positional data. The server 14 may use signal strength detected between the mobile device 12, access controls 16, and the wireless access protocol device 216 to determine positional data of the mobile device 12.

The workstation allocation system 10 may include a workstation determination engine 400 configured to determine possible workstations 220 for the mobile device 12 within a zone of interest 310. The zone of interest 310 may be an area around a mobile device 12 at a selected range, which may be a numerical radius around an access control (as shown in FIG. 1) or a designated location (e.g., a specific building, room 208, etc). For example, the zone of interest 310 may be a set of geographical coordinates, a range away from a geographical coordinate, a building, a section of the building, a floor in the building, a hallway in the building, a room in the building, and a specific distance between the mobile device 12 and a specific access control 16.

The workstation determination engine 400 is comprised of modules including a location determination module 410; a workstation preference module 420, and a workstation scheduling module 430. Each module 410, 420, 430 may be located on either the mobile device 12 or the server 14. Alternatively, the modules 410, 420, 430 may be distributed between the mobile device 12 and the server 14.

The location determination module 410 is configured to detect positional data of the mobile device 12, as described above utilizing at least one of the mobile device 12, access controls 16, and wireless access protocols 216. The positional data may include the location of the mobile device 12 at various granularity levels including but not limited to a geographical coordinate, a building where the mobile device 12 is located, a section of the building where the mobile device 12 is located, a floor in the building where the mobile device 12 is located, a hallway in the building where the mobile device 12 is located, a room where the mobile device 12 is located, and a distance between the mobile device 12 and each of the access controls 16. For example, from the distance between the mobile device 12 and each of the access controls 16, a location within workstation allocation system 10 (i.e. a building) may be determined, since the location of each access controls 16 is already known. In another example, from the distance between the mobile device 12 and each of the wireless access protocol devices 216, a location within workstation allocation system 10 (i.e. a building) may be determined, since the location of each wireless access protocol devices 216 is already known.

The work station preferences module 420 is configured to maintain and/or obtain a list of workstation 220 preferences for the individual using the mobile device 12. Workstation 220 preferences may include preferred temperature settings, preferred lighting settings, preferred computer monitor settings (e.g., brightness), preferred desk settings, (e.g., height, or handicap accessible), preferred workstation locations, preferred proximity to another person, preferred proximity to a restroom, preferred proximity to an exit, preferred proximity to an elevator, preferred proximity to a staircase, preferred window glass shade, preferred side of the building (e.g., north, south, east, or west), preferred chair settings (e.g., height, or handicap accessible), preferred computer settings (e.g., network, login ID, VPN settings, etc.), preferred computer mouse settings (e.g., click speed or scroll speed), preferred computer volume setting, or workstation restrictions (e.g., certain department employees may be required to work in certain rooms 208 or areas of the building, or only managers may get their own room 208).

The workstation scheduling module 430 is configured to determine a list of available workstations 220 within the zones of interest 310 of an individual in response to a current positional data of their mobile device 12. Alternatively, an individual may manually select a time (i.e., in the future) and a zone of interest 310 when they would like a reserve the workstation 220, the workstation scheduling module 430 may determine available workstations 220 within the zones of interest 310 during that time. The workstation scheduling module 430 may have access to electronic work schedules to determine availability of workstations 220 current or in the future. The workstation scheduling module 430 may also detect the current location of all the mobile devices 12 within the workstation allocation system 10 to determine which workstations 220 have a mobile device 12 stationed there or that has been stationed there within a selected time period (e.g., that day).

The workstation scheduling module 430 may filter out (e.g., remove from consideration) workstations 220 that do not align with a workstation 220 preference of the individual carrying the mobile device 12. For example, the workstation scheduling module 430 may filter out workstations located in managerial offices if the individual is not a manager.

An individual using the mobile device 12 may select a workstation 220 form the list of available workstation 220. The workstation scheduling module 430 may provide a route including turn-by-turn directions and/or a map having directions to the workstation 220 from the current location of the individual, as detected by the location of the mobile device 12 belonging to the individual. The workstation scheduling module 220 may provide turn-by-turn directions using the location determination module 410. The workstation scheduling module 430 may also give authorization to an individual to control workstation 220 components 222, such as, for example, computers, lights, telephones, monitors, speakers, shade of window glass, blinds, environmental comfort settings (e.g., heating and cooling), etc.

Figure 2:
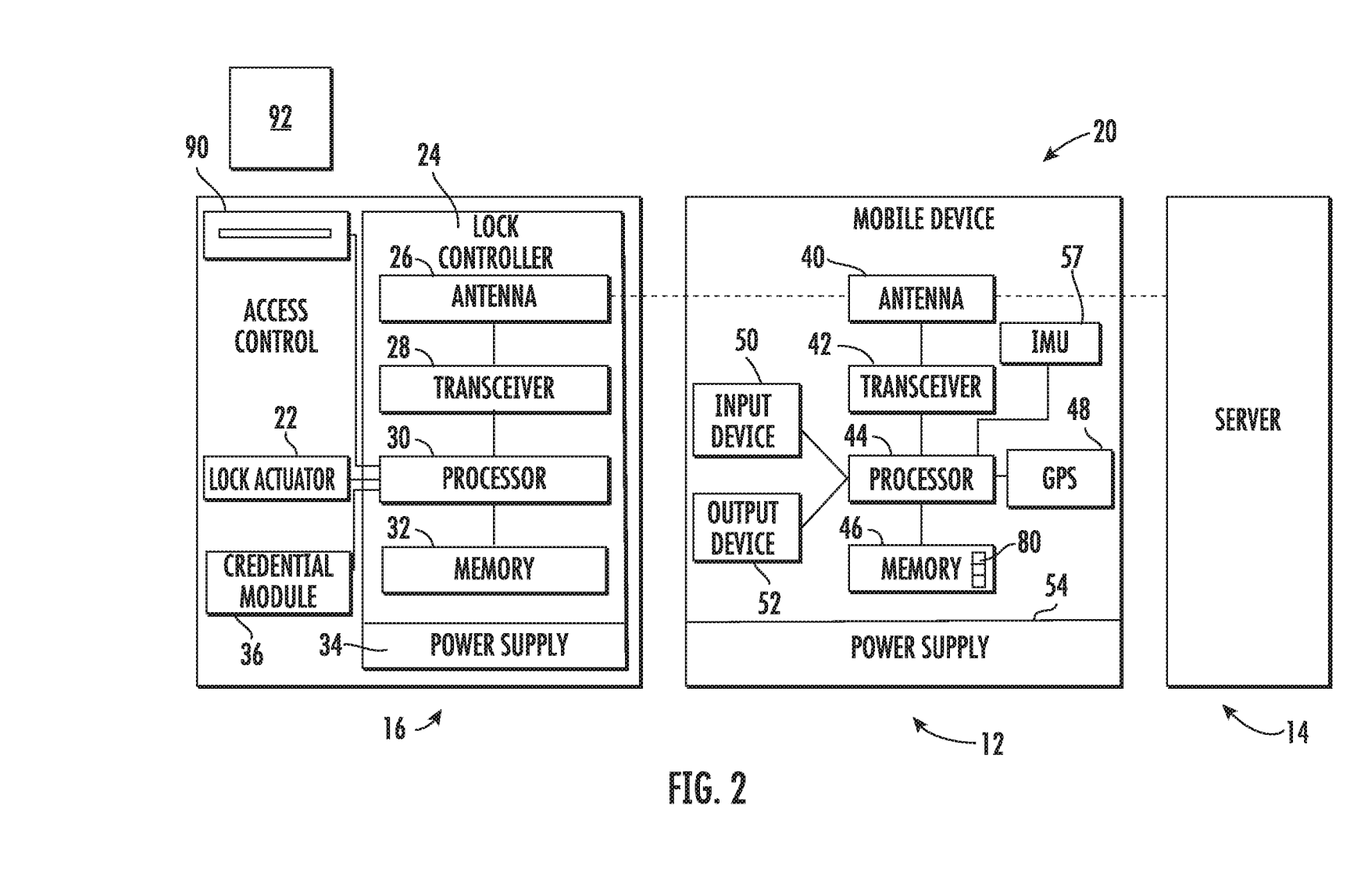
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an IMU sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art. In some embodiments, the key transceiver 42 and the key antenna 40 may also be used to communicate individual components at the workstation 220 components 222, such as, for example, computers, lights, telephones, monitors, speakers, shade of window glass, blinds, environmental comfort settings (e.g., heating and cooling), etc, thus allowing an individual to adjust the workstation 220 components 222 through the model device 12. Alternatively, the workstation 220 components 22 may be in communication with the server 14 and an individual may adjust the workstation 220 components 222 through their mobile device 12 communicating with the server 14 and then to the workstation 220 components 222. In an embodiment, the server 14 is in communication with each workstation 220 component 22.

Figure 3:
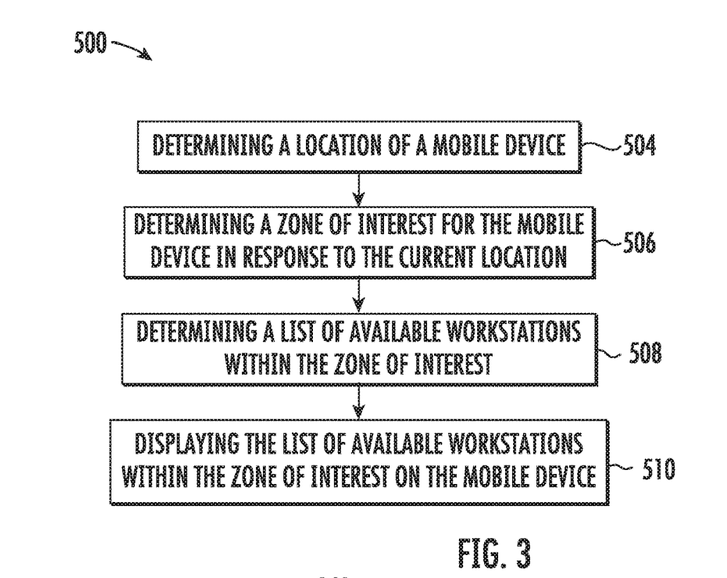
FIG. 3 is a flow diagram illustrating a method of recommending workstations, according to an embodiment of the present disclosure.
Figure 4:
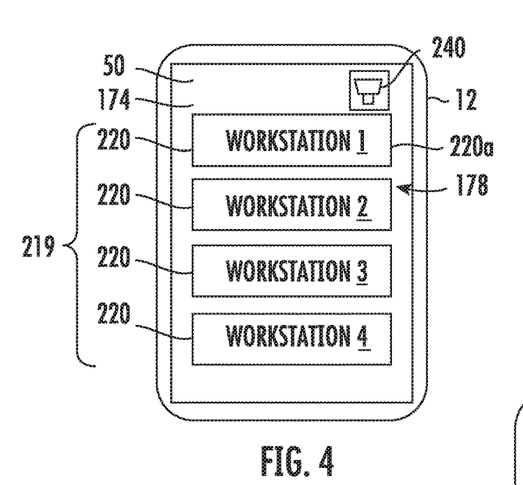
FIG. 4 is a graphical user interface of the mobile device of FIG. 1, according to an embodiment of the present disclosure.
Figure 5:
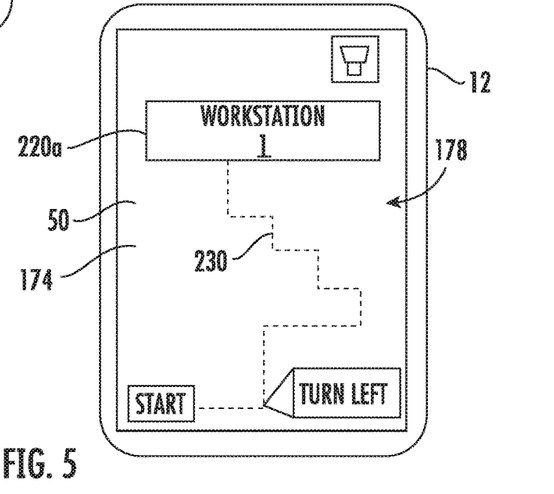
FIG. 5 is a graphical user interface of the mobile device of FIG. 1, according to an embodiment of the present disclosure.

Referring now to FIG. 3-5 with continued reference to FIGS. 1-2. FIG. 3 shows a flow chart of a method 500 of recommending workstations 220. The method 500 may be performed by the mobile device 12 and/or the server 14. FIG. 4 and FIG. 5 illustrate a mobile device 12 graphical user interface 178. As mentioned above, the mobile device 12 may be a laptop computer, smart phone, tablet computer, smart watch, or any other mobile computing device known to one of skill in the art. In the example shown in FIGS. 4 and 5, the mobile device 12 is a touchscreen smart phone. The mobile device 12 may include a display screen 174 and an input device 50, such as, example, a mouse, a touch screen, a scroll wheel, a scroll ball, a stylus pen, a microphone, a camera, etc. In the example shown in FIGS. 4 and 5, since the mobile device 12 is a touchscreen smart phone, then the display screen 174 may also function as an input device 50. FIGS. 4 and 5 illustrate a graphical user interface 178 on the mobile device 12. A user (e.g., an installer) may interact with the workstation determination engine 400 through the graphical user interface 178 by selection input, such as, for example, a "click", "touch", verbal command or any other input to the user interface 178.

At block 504, a location of a mobile device 12 is determined. In an embodiment, the location of the mobile device 12 is a current location of the mobile device 12. In an embodiment, as described above, the current location of the mobile device 12 may be determined utilizing short-range wireless signal triangulation between the mobile device 12 and at least one of access controls 16 and wireless access protocol devices 216. In another embodiment, as also described above, the current location of the mobile device 12 is determined utilizing short-range wireless distance proximity measurements between the mobile device 12 and at least one of access controls 16 and wireless access protocol devices 216. In another embodiment, the location of the mobile device 12 is a future location of the mobile device 12. The future locations of the mobile device 12 may be determined from electronic schedules and/or predictive locations of the mobile device 12 based upon past location of the mobile device 12.

At block 506, a zone of interest 310 for the mobile device 12 is determined in response to the location of the mobile device 12. At block 508, a list 219 of available workstations 220 within the zone of interest 310 is determined.

At block 510, a list 219 of available workstations 220 within the zone of interests 310 is displayed on the mobile device 12. The list 219 of available workstations 220 may be filtered by the workstation preferences module 420, thus the method 500 may further comprise: determining workstation preferences associated with a mobile device 12; and removing workstations 220 from the 219 list not aligned with the workstations 210 preferences, as described above. A user of the mobile device 12 may select a filter 240 to filter the list 219 of available workstations 220.

The method 500 may further comprise: receiving a selection input from an input device 50 of the mobile device 12, the selection input selecting a desired workstation 220a from the list of available workstations 220. Once the desired workstation 220a is selected via the selection input, the workstation scheduling module 430 may identify that desired workstation 220a as occupied for a specific period of time. The specific period of time may be adjusted through a selection input an input device 50 of the mobile device 12. The selected period of time may be determined based upon the location of the mobile device 12. For example, once an individual gets a selected distance away from the desired workstation 220a (e.g., leave the building) for greater than a selected period of time then the desired workplace 220a may once again be reassigned to another user. The mobile device 12 may be granted authorization to adjust components of the desired workstation 220a, such as, for example, the lighting. The method 500 may include: displaying a route 230 to the desired workstation 220a on the mobile device 12. The method 500 may include: granting the mobile device 12 authorization to actuate access controls 16 to access the desired workstation 220a including the building and/or any rooms 208 where the desired workstation 220a may be located. These access controls 16 on door locks may be required to access the desired workstation 220a. For example, the desired workstation 220a may be located in a locked room, thus the mobile device 12 will be granted authorization to actuator the access control 16 on the door of the locked room.

While the above description has described the flow process of FIG. 3 in a particular order, it should be appreciated that unless otherwise specifically required in the attached claims that the ordering of the steps may be varied. Steps of the flow process may also be expanded or removed.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of recommending workstations, the method comprising:
   determining a location of a mobile device;
   determining a zone of interest for the mobile device in response to the location;
   determining a list of available workstations within the zone of interest;
   displaying the list of available workstations within the zone of interests on the mobile device;
   receiving a selection input from an input device of the mobile device, the selection input selecting a desired workstation from the list of available workstations;
   granting the mobile device authorization to actuate access controls to access the desired workstation, wherein the access controls include a lock to a door of a room where the desired workstation is located, the authorization to actuate access controls including a credential to open the lock;
   wherein the location is a current location of the mobile device;
   wherein the current location of the mobile device is determined utilizing short-range wireless distance proximity measurements between the mobile device and one or more of the access controls;
   the method further comprising:
   determining whether the mobile device is a selected distance away from the desired workstation for greater than a selected period of time;
   upon determining that the mobile device is the selected distance away from the desired workstation for greater than the selected period of time, allowing the desired workplace to be reassigned to another user.

2. The method of claim 1, further comprising:
   determining workstation preferences associated with a mobile device; and
   removing workstations from the list not aligned with the workstations preferences.

3. The method of claim 1, further comprising:
   granting the mobile device authorization to adjust components of the desired workstation.

4. The method of claim 1, further comprising:
   displaying a route to the desired workstation on the mobile device.

5. A workstation determination engine for recommending workstations, the workstation determination engine comprising:
   a location determination module configured to determine a location of a mobile device and a zone of interest for the mobile device in response to the location; and
   a workstation scheduling module configured to determine a list of available workstations within the zone of interest and display a list of available workstations within the zone of interests on the mobile device;
   wherein the workstation scheduling module is configured to receive a selection input from an input device of the mobile device, the selection input selecting a desired workstation from the list of available workstations;
   wherein the workstation scheduling module is configured to grant the mobile device authorization to actuate access controls to access the desired workstation, wherein the access controls include a lock to a door of a room where the desired workstation is located, the authorization to actuate access controls including a credential to open the lock;
   wherein the location is a current location of the mobile device;
   wherein the current location of the mobile device is determined utilizing short-range wireless distance proximity measurements between the mobile device and one or more of the access controls;
   wherein the workstation scheduling module is configured to determine whether the mobile device is a selected distance away from the desired workstation for greater than a selected period of time;
   upon determining that the mobile device is the selected distance away from the desired workstation for greater than the selected period of time, the workstation scheduling module allowing the desired workplace to be reassigned to another user.

6. The workstation determination engine of claim 5, further comprising:
   a workstation preferences module configured to determine workstation preferences associated with a mobile device and remove workstations from the list not aligned with the workstations preferences.

7. The workstation determination engine of claim 5, wherein the workstation scheduling module is configured to grant the mobile device authorization to adjust components of the desired workstation.

8. The workstation determination engine of claim 5, wherein the workstation scheduling module is configured to display a route to the desired workstation on the mobile device.

9. A computer program product tangibly embodied on a non-transitory computer readable medium, the computer program product including instructions that, when executed by a processor, cause the processor to perform operations comprising:
   determining a location of a mobile device;
   determining a zone of interest for the mobile device in response to the location;
   determining a list of available workstations within the zone of interest;
   displaying the list of available workstations within the zone of interests on the mobile device;
   receive a selection input from an input device of the mobile device, the selection input selecting a desired workstation from the list of available workstations;
   grant the mobile device authorization to actuate access controls to access the desired workstation, wherein the access controls include a lock to a door of a room where the desired workstation is located, the authorization to actuate access controls including a credential to open the lock;
   wherein the location is a current location of the mobile device;

wherein the current location of the mobile device is determined utilizing short-range wireless distance proximity measurements between the mobile device and one or more of the access controls;
the operations further comprising:
determine whether the mobile device is a selected distance away from the desired workstation for greater than a selected period of time;
upon determining that the mobile device is the selected distance away from the desired workstation for greater than the selected period of time, allow the desired workplace to be reassigned to another user.

\* \* \* \* \*